W. H. SANDIFUR.
CHANGE SPEED MECHANISM.
APPLICATION FILED SEPT. 11, 1913.
1,202,227.
Patented Oct. 24, 1916.
3 SHEETS—SHEET 3.
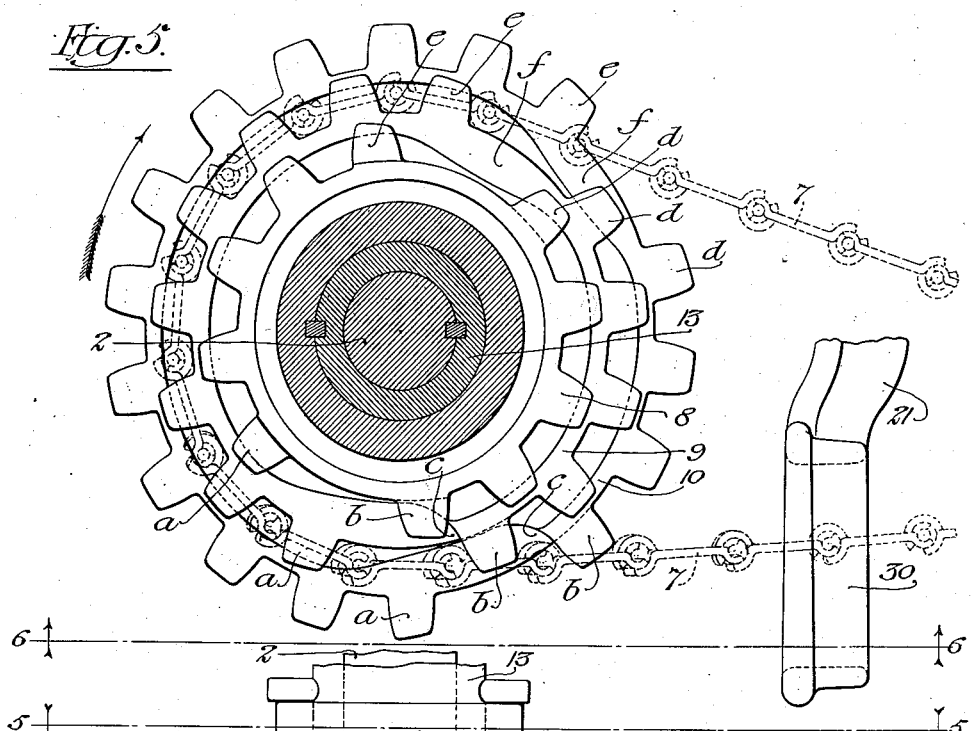
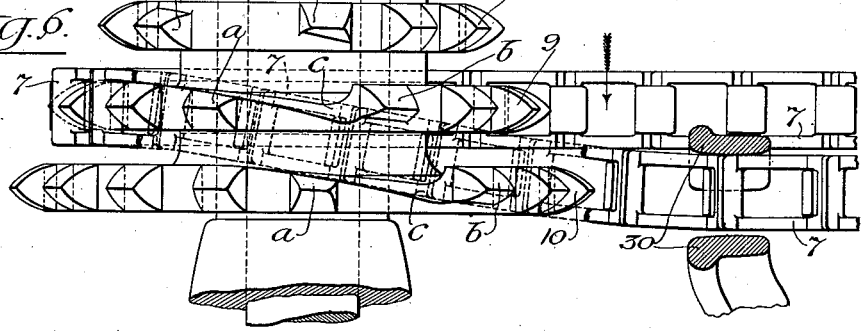
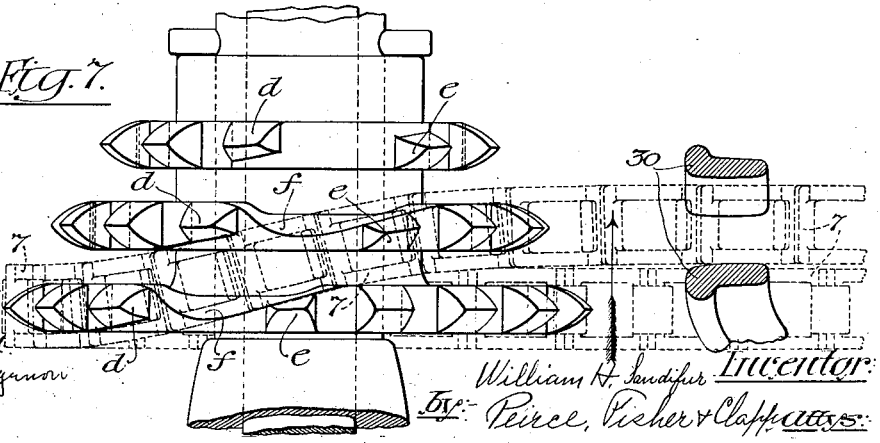

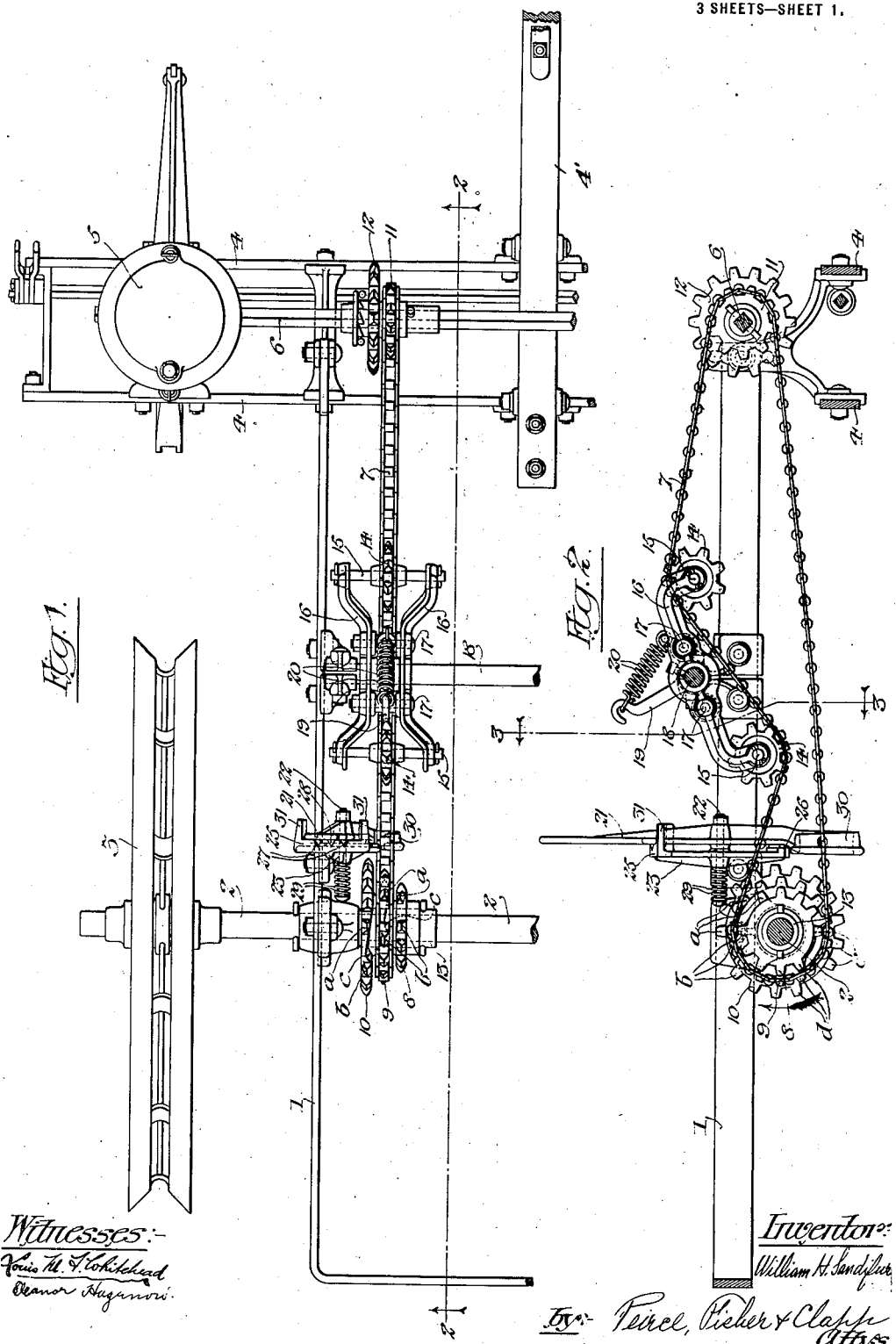

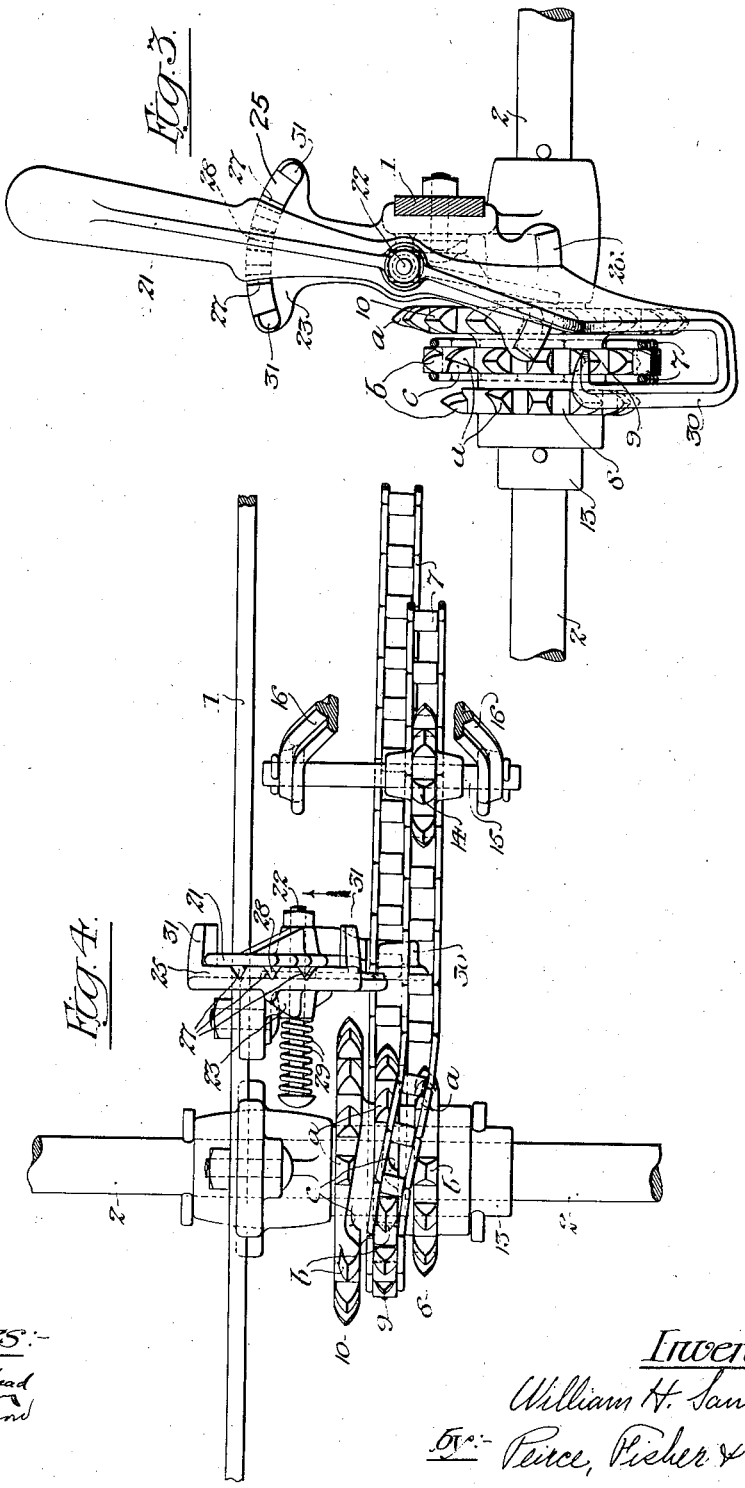

UNITED STATES PATENT OFFICE.

WILLIAM H. SANDIFUR, OF MEDARYVILLE, INDIANA, ASSIGNOR TO JANESVILLE MACHINE COMPANY, OF JANESVILLE, WISCONSIN, A CORPORATION.

CHANGE-SPEED MECHANISM.

1,202,227.

Specification of Letters Patent. Patented Oct. 24, 1916.

Application filed September 11, 1913. Serial No. 789,265.

*To all whom it may concern:*

Be it known that I, WILLIAM H. SANDIFUR, a citizen of the United States, and a resident of Medaryville, county of Pulaski, State of Indiana, have invented certain new and useful Improvements in Change-Speed Mechanism, of which the following is a full, clear, and exact description.

The invention relates to change speed mechanism and seeks to provide a simple and effective construction by which a rotary member or shaft may be driven at different speeds and in definite timed relation to the driving member or shaft, and the invention consists in the features of improvement hereinafter set forth, illustrated in the preferred form in the accompanying drawing and more particularly pointed out in the appended claims.

In many instances, the driven member must be operated by toothed gearing of some sort, so that the ordinary stepped cone pulley and belt cannot be employed for driving the same at different speeds. In accordance with the present invention, a series of sprocket-wheels are so cut away or mutilated that the cooperating chain can be guided laterally and run from one wheel of the series onto another. In the drawings, the invention is shown as applied to a corn planter in which it is desired to operate the seed plates at different speeds, but in definite timed relation, so that a number of seed deposited may be definitely varied, as required.

In the drawings, Figure 1 is a plan view of part of a corn planter with the present improved speed changing mechanism applied thereto. Fig. 2 is a vertical section on the line 2—2 of Fig. 1. Fig. 3 is a detail section on the line 3—3 of Fig. 2. Fig. 4 is a detail plan view showing the chain passing from the small sprocket wheel onto the intermediate wheel. Fig. 5 is an enlarged detail view illustrating the series of mutilated sprocket-wheels, parts being shown in section on the line 5—5 of Fig. 6. Fig. 6 is an inverted plan view of the sprocket-wheels and showing the chain passing from the intermediate wheel onto the large wheel, parts being shown in section on the line 6—6 of Fig. 5, and portions of the chain being shown in dotted lines to more clearly illustrate the construction of the mutilated sprocket-wheels. Fig. 7 is a view similar to Fig. 6, showing the chain passing from the large sprocket wheel down onto the intermediate wheel.

While the drawings illustrate the application of the invention to a corn planter, it is obvious that it may be used for numerous purposes.

As usual, the corn planter frame 1 is mounted upon a transverse cross-axle 2 to which the ground wheels 3 are attached. At its forward end, the frame 1 is connected to a runner frame 4 which is fastened to a pole 4' and carries the seed cans 5. It should be noted that only one-half of the corn planter is illustrated. The plates which control the delivery of the seed from the cans 5 are driven in the usual manner from a transverse shaft 6 journaled in the front runner frame, and this shaft or member is driven from the wheel axle or driving member 2 through the medium of the improved speed changing mechanism.

A drive chain 7 is arranged to pass over any one of a series of sprocket-wheels 8, 9 and 10 on the driving member or wheel axle 2 and over a sprocket wheel 11 on the rotary driven member or shaft 6. If desired, the shaft 6 may be provided with an additional sprocket wheel 12 over which the chain 7 may pass. The sprocket wheels 11 and 12 are keyed to or otherwise suitably secured to the driven member or shaft 6. In the form shown, the sprocket wheels 8, 9 and 10 are keyed to a sleeve 13 and the latter is keyed to the wheel axle or shaft 2. The loose side of the chain also passes over a suitable tightener. In the form shown, the tightener comprises two small idler sprockets 14 which are loosely mounted on two short transverse shafts 15. These shafts are carried upon the offset or separated ends of a pair of arms 16 and the latter are connected by bolts 17 and pivotally mounted to rock upon a cross-bar 18. An arm 19 is fixed to the cross-bar 18 intermediate the arms 16 and is connected to one of the bolts 17 by a spring 20. The chain passes over one of the idlers 14 and under the other, and the parts are so arranged that the spring 20 serves to take up any slack in the chain. The idler pulleys 14 are free to slide laterally on the shafts 15 as the chain is shifted from one of the sprockets on the driving shaft or wheel axle to another.

The sprocket-wheels 8, 9 and 10 are mutilated or cut away to form a passage through which the chain may be guided and caused to run from one wheel onto another, and these cut away portions or passages are inclined across the series of wheels, as most clearly shown in Figs. 5, 6 and 7. Preferably, also, two such passages or cut away portions are provided through one of which the chain passes from a smaller to a larger wheel, and through the other of which the chain passes from a larger wheel to a smaller one. As shown in Figs. 5 and 6, each sprocket-wheel is provided with two teeth $a$ and $b$ on opposite sides of a gap formed by omitting one of the teeth. The teeth $a$ and $b$ of each wheel are also cut away on an incline, the tooth $a$ being cut away on one side and the tooth $b$ on its opposite side. Preferably, also, the side of the large wheel 10 facing the intermediate wheel 9 is cut away between the teeth $a$ and $b$ thereof, as indicated at $c$, and the side of the intermediate wheel next to the smaller wheel is provided with a similar recess. It should also be noted that the gaps or cut away spaces in the several wheels extend across the series at an incline or at an angle to the axis thereof. These mutilated or cut-away portions between the teeth $a$ and $b$ of the wheels form passages through which the chain may be guided either from the small wheel 8 onto the intermediate wheel 9, or from the intermediate wheel 9 onto the large wheel 10. The wheels are also provided with mutilated or cut-away portions through which the chain may pass from the large wheel onto the intermediate wheel and from the latter onto the small wheel. These mutilated portions are formed between the teeth $d$ and $e$ of each wheel, the opposite side faces of which are cut away, as shown in Fig. 7. On each wheel, the tooth between the teeth $d$ and $e$ is omitted and the sides of the intermediate wheel 9 and the large wheel 10 between the teeth $d$ and $e$ thereon are cut away, as indicated at $f$. It should be noted that the mutilated or cut-away portions between the teeth $d$ and $e$ of the wheel extend at an incline across the series, but in a direction opposite to that of the passage-way between the teeth $a$ and $b$ of the wheels.

The ordinary drive chain may be deflected to a certain extent and a suitable shifter is provided for guiding the chain through the mutilated or cut-away portions of the wheels and so cause the chain to pass from one wheel onto another. In the form shown, this shifter comprises an upright lever 21 pivotally connected intermediate its ends by a bolt 22 to a bracket 23. The latter is fixed to the frame 1 and is provided with segmental portions 25 and 26 against which the ends of the lever 21 abut. The upper segment 25 is provided with a series of notches 27 and the lever has a lug 28 arranged to engage one of these notches. A spring 29, coiled about the inner end of the pivot bolt 22, normally holds the lever in position with the lug 28 interlocked with one of the notches 27. The lower end of the lever is provided with a loop or hook 30 which extends on opposite sides of the lower tight portion of the chain 7 with the side walls of the hook or loop closely adjacent the sides of the chain. By grasping the upper end of the lever, the operator can disengage the lug 28 thereof from the notches 27 and shift the lever to guide the tight portion of the chain from one to another of the series of sprocket wheels. Preferably, as shown, the upper segment 25 of the bracket 23 is provided with stop lugs 31 to limit the shift of the lever.

Figs. 6 and 7 are inverted plan views indicating the manner in which the chain is shifted. As shown in Fig. 6, the chain has been passing over the intermediate sprocket wheel 9 and the guiding shifter has been moved to direct the lower tight portion of the chain onto the large sprocket 10. The chain will, however, stay on the intermediate sprocket until its tooth $a$ engages the chain. The chain can then slip to one side, so that it will miss the tooth $b$ of the wheel 9 and pass between the tooth $b$ of the wheel 9 and the tooth $a$ of the wheel 10, and through the gap or cut-away space $c$ of the wheel 10. It is then in such position, as shown in Fig. 6, that the tooth $b$ of the wheel 10 will engage the chain and the latter, upon the continued revolution of the wheels, will run from the intermediate wheel 9 onto the large wheel 10. The chain will, of course, then stay upon the large wheel 10 until the shifter is again moved. In a similar manner, the chain may be shifted from the small sprocket wheel 8 onto the intermediate wheel 9 through the gap or passage-way between the teeth $a$ and $b$ thereof. In Fig. 4 the chain is shown in the position assumed when it has passed almost completely from the small wheel onto the intermediate wheel.

As shown in Fig. 7, the chain has been running on the large wheel 10 and the shifter has been moved to guide it onto the intermediate wheel 9. When the tooth $d$ of the wheel 10 engages the chain, the latter can move to one side, so that it misses the tooth $c$ of the wheel 10 and engages the tooth $e$ of the wheel 9. Upon the continued rotation of the wheels, the chain passes between the tooth $d$ of the wheel 9 and the tooth $e$ of the wheel 10 and through the recess $f$ of the wheel 10 until it has passed completely onto the wheel 9. In a similar manner, the chain may be shifted from the intermediate wheel 9 onto the small wheel 8. The chain tightener automatically takes up the slack of the chain in its different positions. The guide wheels 14 are free to slide on the shafts 15 as the chain is shifted from one of the sprocket wheels onto another.

The invention provides an extremely simple and effective mechanism by which the speed of the driven member may be varied, as desired, without stopping the operation of the parts. At the same time, the driven member is maintained and is driven by toothed gearing in definite timed relation with the driving member.

It is obvious that changes may be made in the details set forth without departure from the essentials of the invention as defined in the claims.

I claim as my invention:—

1. In a change-speed mechanism, the combination with rotary driving and driven members, of chain-and-sprocket gearings connecting said members and including a plurality of sprocket wheels of different sizes, said wheels having teeth omitted and adjacent teeth beveled to permit the running of the chain from one onto the other of said wheels, substantially as described.

2. In a change-speed mechanism, the combination with rotary driving and driven members, of chain-and-sprocket gearings connecting said members and including a plurality of sprocket wheels of different sizes, said sprocket wheels being arranged closely adjacent and each having two mutilated portions to permit the running of the chain laterally and in opposite directions from one of said wheels directly onto another, and a shift lever having a looped portion engaging said chain for effecting its lateral movement in opposite directions and into operative engagement with any one of said wheels, substantially as described.

3. A chain-and-sprocket mechanism comprising a series of sprocket wheels of different sizes arranged closely adjacent and side by side, and a chain coöperating therewith, each of said wheels having teeth omitted and adjacent teeth cut away to form a passageway extending at an incline across the series of wheels and thereby permitting running of the chain laterally through said passageway from one to another of said wheels, substantially as described.

4. A change-speed mechanism comprising a series of sprocket wheels of different sizes arranged side by side, and a chain coöperating therewith, said series of sprocket wheels having mutilated or cut-away portions forming two oppositely inclined passageways extending across the series of wheels to permit the running of a chain laterally and in opposite directions from one onto another of said wheels, substantially as described.

5. A change-speed mechanism comprising a series of sprocket wheels of different sizes arranged side by side, a chain coöperating therewith, each of said wheels having teeth omitted and adjacent teeth beveled to form a passageway extending at an incline across the series of wheels, and a shift lever having a looped portion engaging the chain for guiding the same laterally through said inclined passageway, from one wheel directly onto another, substantially as described.

6. A change-speed mechanism comprising a series of sprocket wheels of different sizes and arranged closely adjacent side by side, a chain coöperating therewith, each of said wheels having teeth omitted and adjacent teeth cut away to form two oppositely inclined passageways extending across the series of wheels, and a shifter for guiding the chain laterally and in opposite directions through said passageway onto any one of said wheels, substantially as described.

7. A change-speed mechanism comprising a series of sprocket wheels arranged closely adjacent side by side, a chain coöperating therewith, each of said wheels having teeth omitted and adjacent teeth cut away, and the sides of the large and intermediate wheels being cut away to form a passageway for the chain extending at an incline across the series of wheels, and a shifter engaging the chain to guide the same laterally through said inclined passageway from one wheel directly onto another, substantially as described.

WILLIAM H. SANDIFUR.

Witnesses:
E. S. MERRILL,
E. A. WHITE.